A. G. SCHULTZ.
ROLLER BEARING.
APPLICATION FILED MAY 9, 1907.

907,293.

Patented Dec. 22, 1908.

Witnesses

Inventor
Augustus G. Schultz
by Waid Cameron
Attys

UNITED STATES PATENT OFFICE.

AUGUSTUS G. SCHULTZ, OF ALBANY, NEW YORK.

ROLLER-BEARING.

No. 907,293.  Specification of Letters Patent.  Patented Dec. 22, 1908.

Application filed May 9, 1907. Serial No. 372,696.

*To all whom it may concern:*

Be it known that I, AUGUSTUS G. SCHULTZ, a citizen of the United States, residing at the city of Albany, in the county of Albany and State of New York, have invented certain new and useful Improvements in Roller-Bearings, of which the following is a specification.

Figure 1:
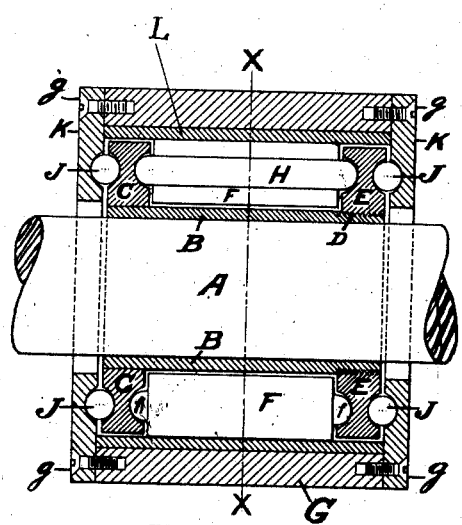
Figure 2:
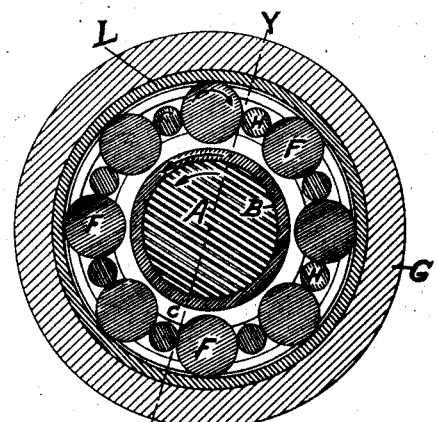
Figure 3:
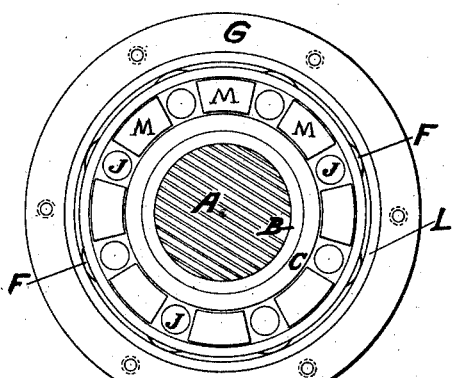
Figure 4:
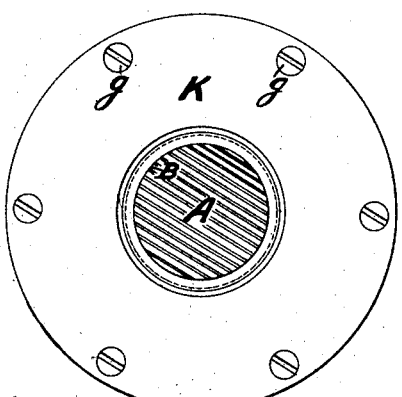
Figure 5:
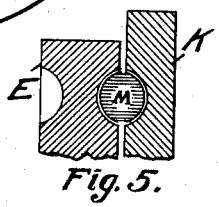

My invention relates to roller bearings, and the object of my invention is to provide a roller and ball bearing in which the friction will be reduced to a minimum, and which is capable of ready adjustment. I attain this object by means of the mechanism illustrated in the accompanying drawings, in which:

Figure 1 is a section along the line Y—Y on Fig. 2. Fig. 2 is a section along the line X—X on Fig. 1. Fig. 3 is an end elevation after the removal of the end plate. Fig. 4 is an end elevation. Fig. 5 is a detail view showing the position of one of the separators placed between the flange of the spool and the end plate.

Similar letters refer to similar parts throughout the several views.

The shaft, A, has a jacket, B, fitted in close contact therewith. At one end of said jacket, B, I place the flange, C, projecting from said jacket. The other end of said jacket, B, is preferably threaded, as at D, by means of which threads I secure the flange E thereon. Between the flanges, C and E, are mounted the rollers, F, which rollers engage the jacket, B, and the inner surface of the sleeve G. Placed between and separating the adjacent rollers, F, F, I place a series of smaller rollers, H, H. Said smaller rollers are mounted, as are the larger rollers, in the flanges, C, E, attached to or forming a part of the jacket, B, aforesaid.

For the purpose of forming a bearing for the rollers, F and H, in the flanges, C and E, I preferably cut out of the sides of the flanges, C and E, an annular groove, semi-circular in section, adapted to receive the projection, f, on the ends of the rollers, F and H, respectively. It will be noted that the large rollers, F, and the small rollers, H, are thus retained by means of the flanges, C and E, in the same relative position in reference to the center of the shaft, A, and the rollers, F, bear directly upon the jacket, B, and the outer sleeve, G, so that the strain does not fall upon the smaller rollers, H, which act simply as anti-friction rollers, and their small diameter does not weaken the efficiency of the mechanism. For the purpose of further reducing the friction and taking the end thrust, I place balls, J, J, between each of the flanges, C and E, and the end plates, K, preferably cutting away a portion of the flange, making a groove, adapted to receive a portion of the ball, J, and form in the adjoining surface of the plate, K, a like annular groove.

It is very essential in preparing roller bearings, where there is heavy weight to be supported that the parts should be so adjusted that there will be no possibility of grinding or displacement; otherwise breaking of the parts is sure to follow, and loss in time, if not in life is apt to follow. It is, therefore, necessary to arrange these rollers so that the strain will not come on the small rollers, and it is likewise necessary to provide the housing for the balls such that they can not get out of their proper positions and interfere with the working of the rollers, or with each other. In Fig. 3 I show a series of separators, preferably blocks, M, placed in the same groove that the balls, J, occupy, and which are for the purpose of separating said balls from each other. Fig. 5 is a section showing the position of one of these separators, M, between the outer plate, K, and the flange, E. When the end plates, K, are in position all dust and dirt are kept out of the running parts and the friction is reduced to a minimum.

I have thus provided for keeping the rollers separated entirely from the balls by means of the flanges C, E, and have placed the rollers in respect to each other so that the smaller ones are entirely out of contact with the traveling sleeve and the outer sleeve G or steel bushing, L. A steel bushing, L, is placed in contact with the interior surface of the outer sleeve, G.

The end plates, K, K, may be secured to the outer sleeve, G, by means of suitable screw, g, or in any suitable manner. The flange, C, may be formed integral with the jacket, B, or secured thereto in any suitable manner.

What I claim as my invention and desire to secure by Letters Patent is:

1. In a roller bearing; a shaft; a jacket fitted thereto; a series of rollers engaging said jacket; a sleeve engaging said rollers; a series of flanges connected with said jacket, each of said flanges having on each side an annular groove; said rollers mounted in one of said grooves in each of said flanges; a series of smaller rollers placed intermediate of said first mentioned rollers and mounted in the same grooves in said flanges that the larger rollers are mounted in end plates on said sleeve; and balls placed in the others of said grooves and adapted to engage the said end plates.

2. In a roller bearing; a shaft; a series of rollers engaging said shaft; a sleeve engaging said rollers; a series of rollers smaller than and placed intermediate of said first mentioned rollers; a means at each end of said rollers for retaining each roller of each series in relative position to each other; two series of balls; end plates secured to said sleeve; said balls being disposed between said end plates and the said roller retaining means; and separators between said balls.

In testimony whereof I have affixed my signature in presence of two witnesses.

AUGUSTUS G. SCHULTZ.

Witnesses:
FREDERICK W. CAMERON,
LOTTIE PRIOR.